United States Patent
Hayashi

(10) Patent No.: US 9,660,275 B2
(45) Date of Patent: May 23, 2017

(54) FUEL CELL INCLUDING GAS FLOW PATH LAYER

(75) Inventor: Tomokazu Hayashi, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 170 days.

(21) Appl. No.: 13/577,175

(22) PCT Filed: Mar. 2, 2010

(86) PCT No.: PCT/JP2010/001399
§ 371 (c)(1),
(2), (4) Date: Aug. 3, 2012

(87) PCT Pub. No.: WO2011/108022
PCT Pub. Date: Sep. 9, 2011

(65) Prior Publication Data
US 2012/0308913 A1 Dec. 6, 2012

(51) Int. Cl.
*H01M 8/10* (2016.01)
*H01M 8/0258* (2016.01)
*H01M 8/1018* (2016.01)

(52) U.S. Cl.
CPC .. *H01M 8/0258* (2013.01); *H01M 2008/1095* (2013.01)

(58) Field of Classification Search
None
See application file for complete search history.

(56) References Cited

U.S. PATENT DOCUMENTS

2001/0044373 A1* 11/2001 Lott et al. .................. 502/101
2002/0192539 A1* 12/2002 Kobayashi et al. ............ 429/44

(Continued)

FOREIGN PATENT DOCUMENTS

JP  8-138701 A  5/1996
JP  2007-087768 A  4/2007

(Continued)

*Primary Examiner* — Barbara Gilliam
*Assistant Examiner* — Adam A Arciero
(74) *Attorney, Agent, or Firm* — Sughrue Mion, PLLC

(57) ABSTRACT

A fuel cell is configured to comprise a power generation layer including an electrolyte membrane, an anode and a cathode, separators and a gas flow path layer provided between the power generation layer and the separator. The gas flow path layer is structured by a plurality of corrugated elements. Each corrugated element has a corrugated cross section where first convexes that are convex toward the separator and second convexes that are convex toward the power generation layer are alternately arranged. The plurality of corrugated elements are arranged, such that a top surface of the first convex in one corrugated element and a bottom surface of the second convex in an adjacent corrugated element cooperatively form an integral surface, and a plurality of through holes are formed between the respective adjacent corrugated elements. The plurality of corrugated elements include a corrugated element having positions of the first convexes and the second convexes shifted in a positive side of the first direction from those of an adjacent corrugated element, and a corrugated element having positions of the first convexes and the second convexes shifted in a negative side of the first direction from those of an adjacent corrugated element. The volume of a first reaction gas flow path, which is formed along the positions of the second convexes on a separator-side of the gas flow path layer, is less than the volume of a second reaction gas flow path, which is formed along the positions of the first convexes on a power generation layer-side of the gas flow path layer.

5 Claims, 5 Drawing Sheets

(56) References Cited

U.S. PATENT DOCUMENTS

| | | | |
|---|---|---|---|
| 2009/0089989 A1 | 4/2009 | Hashimoto et al. | |
| 2009/0155665 A1 | 6/2009 | Hashimoto | |

FOREIGN PATENT DOCUMENTS

| | | | |
|---|---|---|---|
| JP | 2007-214020 A | 8/2007 | |
| JP | 2008-108573 A | 5/2008 | |
| JP | 2008-146947 A | 6/2008 | |
| JP | 2008-243394 A | 10/2008 | |
| JP | 2008-287943 A | 11/2008 | |
| JP | 2008-287944 A | 11/2008 | |
| JP | 2008-287955 A | 11/2008 | |
| JP | 2008-305755 A | 12/2008 | |
| JP | 2009-021022 A | 1/2009 | |
| JP | 2010-170984 A | 8/2010 | |
| JP | 2011-181402 A | 9/2011 | |
| JP | 2011-181442 A | 9/2011 | |
| WO | 2009/154203 A1 | 12/2009 | |

\* cited by examiner

STACKING DIRECTION

POWER GENERATION LAYER-SIDE

FUEL CELL INCLUDING GAS FLOW PATH LAYER

CROSS REFERENCE TO RELATED APPLICATIONS

This application is a National Stage of International Application No. PCT/JP2010/001399 filed Mar. 2, 2010, the contents of all of which are incorporated herein by reference in their entirety

TECHNICAL FIELD

The present invention relates to a fuel cell, and more specifically to a fuel cell having a gas flow path layer provided between a power generation layer and a separator.

BACKGROUND ART

A fuel cell, such as a polymer electrolyte fuel cell converts the chemical energy of a substance directly into electrical energy by the electrochemical reaction of reaction gases (fuel gas and oxidizing gas) supplied to a pair of electrodes (anode and cathode) arranged across an electrolyte membrane.

In the fuel cell, it is known in the art that providing a gas flow path layer made of expanded metal (metal lath) between a power generation layer including an electrolyte membrane and a pair of electrodes and a separator improves the diffusivity of the reaction gas and increases the power generation efficiency of the fuel cell.

SUMMARY

The above prior art, however, does not sufficiently consider the potential effect of water produced in the course of power generation on the performance of the fuel cell. There is accordingly a possibility of further improvement of the performance of the fuel cell.

This problem is not characteristic of the polymer electrolyte fuel cell including the gas flow path layer made of expanded metal but is commonly found in various fuel cells with the gas flow path layer including a reaction gas flow path between the power generation layer and the separator.

Consequently, in order to solve at least part of the foregoing, there is a need to improve the performance of a fuel cell including a gas flow path layer provided between a power generation layer and a separator.

In order to achieve at least part of the foregoing, the present invention provides various aspects and embodiments described below.

According to a first aspect, there is provided a fuel cell, comprising:

a power generation layer including an electrolyte membrane, an anode formed on one side of the electrolyte membrane and a cathode formed on the other side of the electrolyte membrane;

a pair of separators arranged across the power generation layer; and a gas flow path layer provided between the power generation layer and at least one of the separators, wherein the gas flow path layer is structured by a plurality of corrugated elements, wherein each corrugated element has a corrugated cross section where first convexes that are convex toward the separator and second convexes that are convex toward the power generation layer are alternately arranged in a first direction, and the plurality of corrugated elements are arranged in a second direction that is substantially perpendicular to a stacking direction of the fuel cell and the first direction, such that at least part of a top surface of the first convex in one corrugated element and at least part of a bottom surface of the second convex in an adjacent corrugated element cooperatively form an integral surface, and a plurality of through holes are formed between the respective adjacent corrugated elements, and wherein the plurality of corrugated elements constituting the gas flow path layer include a corrugated element having positions of the first convexes and the second convexes shifted in a positive side of the first direction from those of an adjacent corrugated element, and a corrugated element having positions of the first convexes and the second convexes shifted in a negative side of the first direction from those of an adjacent corrugated element, and wherein volume of a first reaction gas flow path, which is formed along the positions of the second convexes on a separator-side of the gas flow path layer, is less than volume of a second reaction gas flow path, which is formed along the positions of the first convexes on a power generation layer-side of the gas flow path layer and is connected with the first reaction gas flow path via the through hole.

In the fuel cell according to this aspect, the volume of the first reaction gas flow path formed along the positions of the second convexes on the separator-side of the gas flow path layer is less than the volume of the second reaction gas flow path formed along the positions of the first convexes on the power generation layer-side of the gas flow path layer. Produced water flowing from the power generation layer into the second reaction gas flow path of the gas flow path layer is accordingly pulled via the through hole into the first reaction gas flow path and is efficiently discharged through the first reaction gas flow path. This configuration of the fuel cell facilitates discharge of the produced water from the power generation layer, thereby preventing an increase in concentration overpotential due to the produced water and improving the output performance. This configuration of the fuel cell also facilitates separation between water and the reaction gas in the gas flow path layer and prevents an increase in pressure loss in the gas flow path layer due to the presence of the produced water, thus preventing a variation in distribution of the reaction gas among the respective cells and thereby a variation in cell voltage among the respective cells. In the fuel cell of this aspect, the plurality of corrugated elements constituting the gas flow path layer include both the corrugated element having the positions of the first convexes and the second convexes shifted in the positive side of the first direction from those of the adjacent corrugated element, and the corrugated element having the positions of the first convexes and the second convexes shifted in the negative side of the first direction from those of the adjacent corrugated element. The first reaction gas flow path and the second reaction gas flow path are accordingly formed to be serpentine from side to side. This improves the diffusivity of the reaction gas and increases the power generation efficiency. This configuration of the fuel cell accordingly improves the performance of the fuel cell including the gas flow path layer provided between the power generation layer and the separator.

According to a second aspect depending on the first aspect, there is provided the fuel cell, wherein in each of the plurality of corrugated elements, a width of the second convex in the first direction is less than a width of the first convex in the first direction.

In the fuel cell of this aspect, the volume of the first reaction gas flow path formed along the positions of the second convexes on the separator-side of the gas flow path layer is made to be less than the volume of the second reaction gas flow path formed along the positions of the first convexes on the power generation layer-side of the gas flow path layer.

According to a third aspect depending on either one of the first aspect and the second aspect, there is provided the fuel cell, wherein in each of the plurality of corrugated elements, a flat section parallel to surface of the power generation layer is formed in a part of the second convex that is in contact with the surface of the power generation layer.

This configuration of the fuel cell advantageously prevents the gas flow path layer from biting into the surface of the power generation layer or the surface of the separator, while ensuring the facilitated discharge of the produced water from the power generation layer and the facilitated separation between water and the reaction gas in the gas flow path layer. This prevents reduction of the output performance and the durability of the fuel cell, and also prevents performance degradation of the fuel cell caused by reduction of the volume of the reaction gas flow path in the gas flow path layer by the biting of the gas flow path layer.

According to a fourth aspect depending on the third aspect, there is provided the fuel cell, wherein in each of the plurality of corrugated elements, contact area of the first convex that is in contact with surface of the separator is greater than contact area of the second convex that is in contact with the surface of the power generation layer.

This configuration of the fuel cell advantageously prevents an increase in electrical resistance between the respective layers and the resulting performance degradation of the fuel cell, while ensuring the facilitated discharge of the produced water from the power generation layer and the facilitated separation between water and the reaction gas in the gas flow path layer.

The present invention may be actualized by diversity of applications, for example, a fuel cell, a fuel cell system including the fuel cell and a moving body, such as an automobile, equipped with the fuel cell system.

DESCRIPTION OF EMBODIMENTS

The invention is described in detail below with reference to embodiments.

A. Embodiment

A-1. Structure of Fuel Cell

Figure 1:
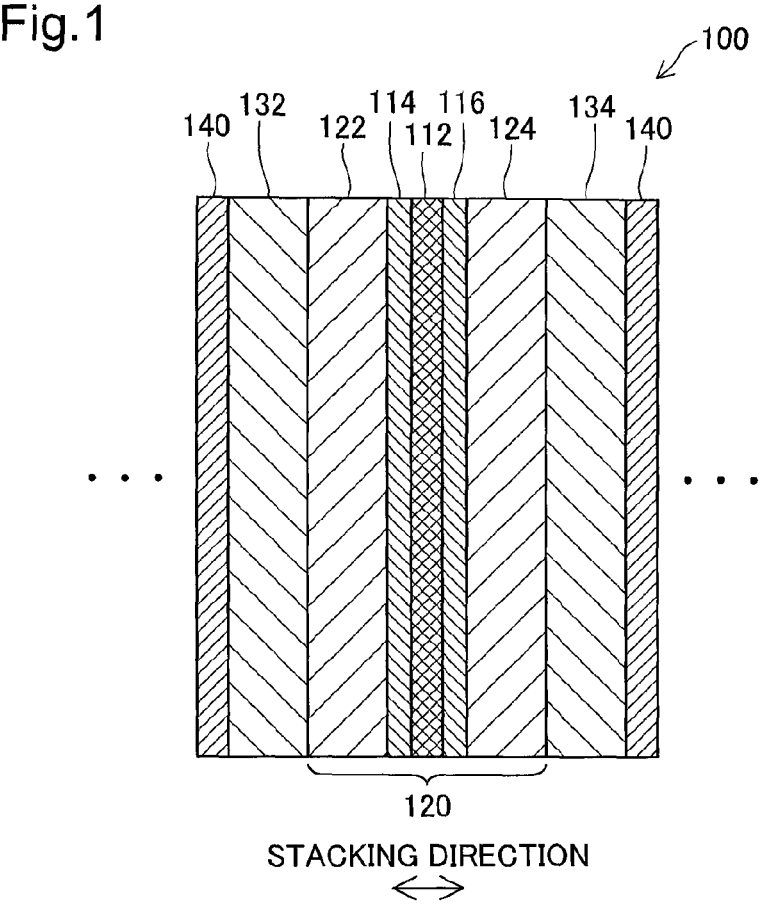
FIG. 1 is a diagram schematically illustrating the structure of a fuel cell according to one embodiment.

FIG. 1 is a diagram schematically illustrating the structure of a fuel cell according to one embodiment. The fuel cell 100 of the embodiment is a polymer electrolyte fuel cell that is relatively small in size and has excellent power generation efficiency. The fuel cell 100 has a stacked structure provided by alternately stacking a plurality of power generation layers 120 and a plurality of separators 140. The fuel cell 100 also has an anode-side gas flow path layer 134 and a cathode-side gas flow path layer 132 (hereinafter collectively referred to as "gas flow path layer") respectively provided between the power generation layer 120 and the separators 140. For the better understanding of the structure of the fuel cell 100, only one cell including the power generation layer 120, the gas flow path layers 132 and 134, and the separators 140 is illustrated in FIG. 1, while the other cells are omitted from the illustration.

The power generation layer 120 includes an electrolyte membrane 112, an anode 116 formed on one side of the electrolyte membrane 112 and a cathode 114 formed on the other side of the electrolyte membrane 112. The laminate of the anode 116 and the cathode 114 (hereinafter collectively referred to as "catalyst layers") in addition to the electrolyte membrane 112 is also called MEA (membrane electrode assembly). The power generation layer 120 also includes an anode diffusion layer 124 provided on the other side of the anode 116 opposite to the side in contact with the electrolyte membrane 112, and a cathode diffusion layer 122 provided on the other side of the cathode 114 opposite to the side in contact with the electrolyte membrane 112.

The electrolyte membrane 112 is an ion exchange membrane made of a fluororesin material or a hydrocarbon resin material and has good proton conductivity in the wet state. The catalyst layers 114 and 116 are formed as layers providing a catalyst for accelerating the electrode reaction and may be made of, for example, a material including platinum-supported carbon and an electrolyte. The anode diffusion layer 124 and the cathode diffusion layer 122 (hereinafter collectively referred to as "diffusion layers") are formed as layers to diffuse reaction gases (oxidizing gas and fuel gas) used for the electrode reaction in the planar direction (i.e., direction substantially orthogonal to the stacking direction of the fuel cell 100 (FIG. 1)) and may be made of, for example, carbon cloth or carbon paper. According to this embodiment, the diffusion layers are treated with, for example, PTFE resin, to be water repellent.

The separator 140 is made of a dense material having gas impermeability and electrical conductivity, for example, compacted dense carbon, metal or conductive resin. The gas flow path layers 132 and 134 serve as gas flow paths to diffuse and make the flows of the reaction gases in the planar direction and are made of expanded metal (metal lath). According to this embodiment, the surface of the gas flow path layers 132 and 134 is treated to be hydrophilic. The detailed structure of the gas flow path layers 132 and 134 will be described later.

Although not illustrated in FIG. 1, the fuel cell 100 further includes a fuel gas supply manifold, a fuel gas discharge manifold, an oxidizing gas supply manifold and an oxidizing gas discharge manifold, which pass though the fuel cell 100 in its stacking direction. The fuel gas supplied to the fuel cell 100 is distributed via the fuel gas supply manifold into the anode-side gas flow path layers 134 of the respective cells and is then supplied to the anode side of the power generation layers 120 to be subjected to the electrochemical reaction in the power generation layers 120. The remaining fuel gas that is not consumed by the reaction is discharged through the fuel gas discharge manifold to the outside. The oxidizing gas supplied to the fuel cell 100 is distributed via the oxidizing gas supply manifold into the cathode-side gas flow path layers 132 of the respective cells and is then supplied to the cathode side of the power generation layers 120 to be subjected to the electrochemical reaction in the power generation layers 120. The remaining oxidizing gas that is not consumed by the reaction is discharged through the oxidizing gas discharge manifold to the outside. The fuel gas may be, for example, hydrogen gas, and the oxidizing gas may be, for example, the air.

The fuel cell 100 further includes a cooling medium supply manifold, through which a cooling medium is supplied, and a cooling medium discharge manifold, through which the cooling medium is discharged. The cooling medium may be, for example, water, an antifreeze such as ethylene glycol, or the air.

Figure 2:
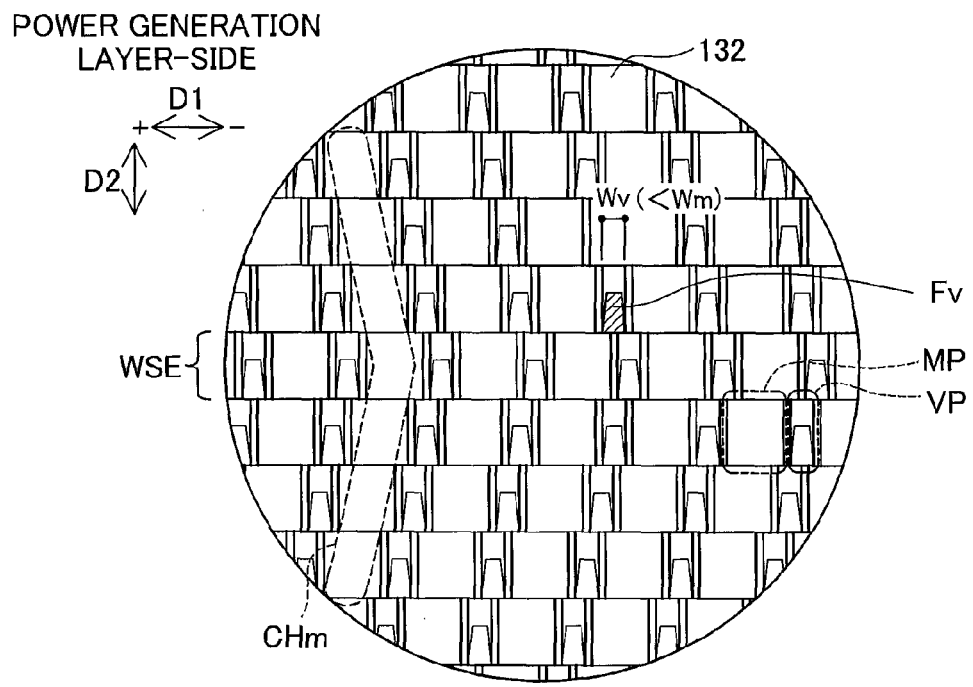
FIG. 2 is a diagram illustrating the structure of a gas flow path layer.
Figure 3:
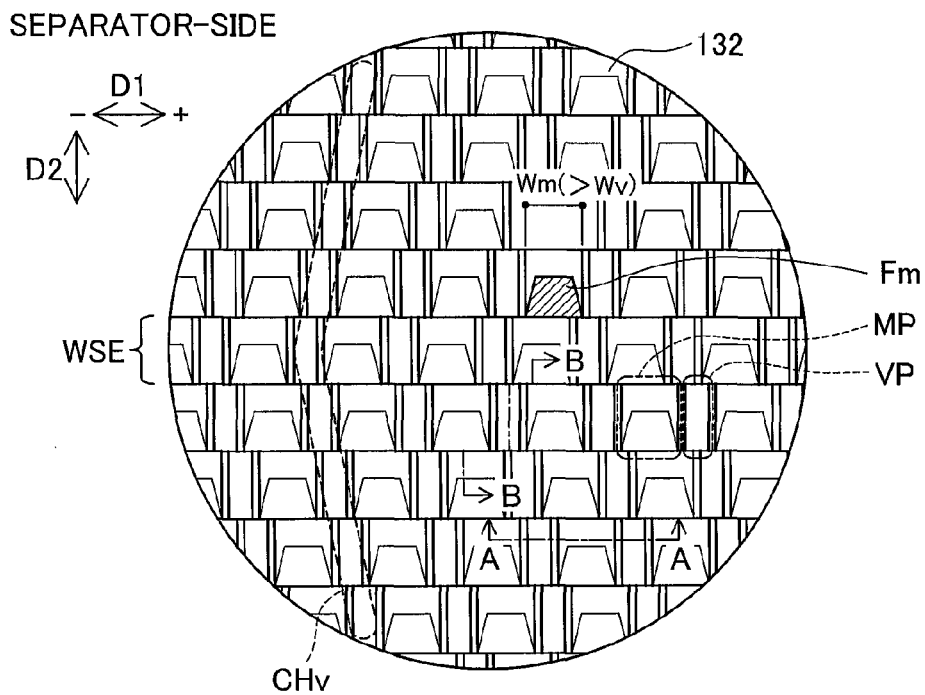
FIG. 3 is a diagram illustrating the structure of the gas flow path layer.
Figure 4:
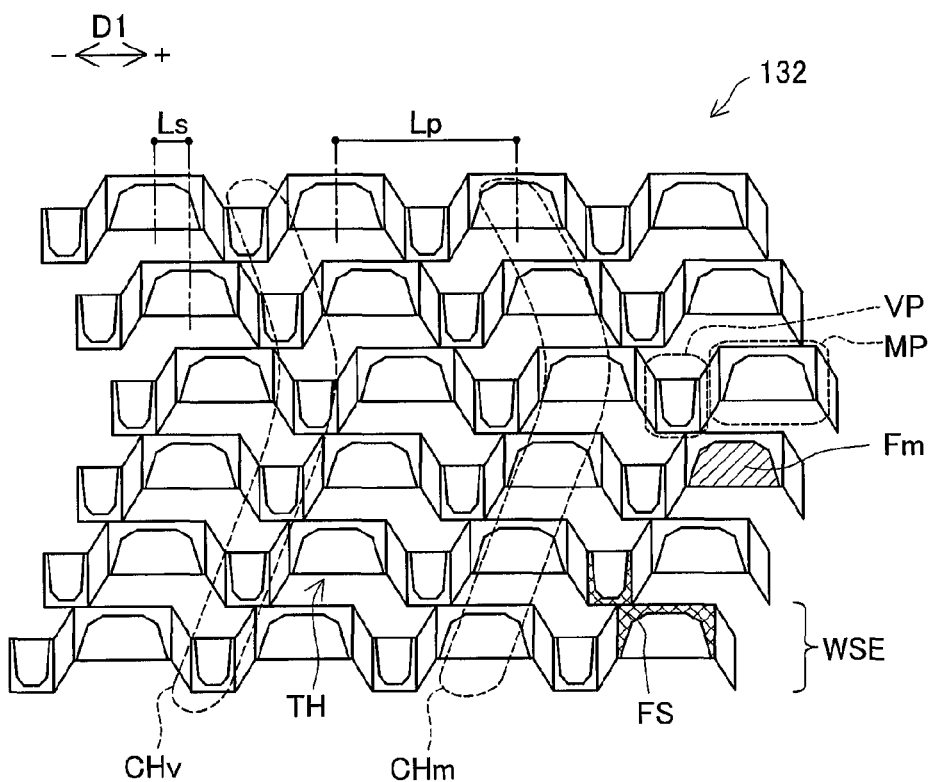
FIG. 4 is a diagram illustrating the structure of the gas flow path layer.
Figure 5:
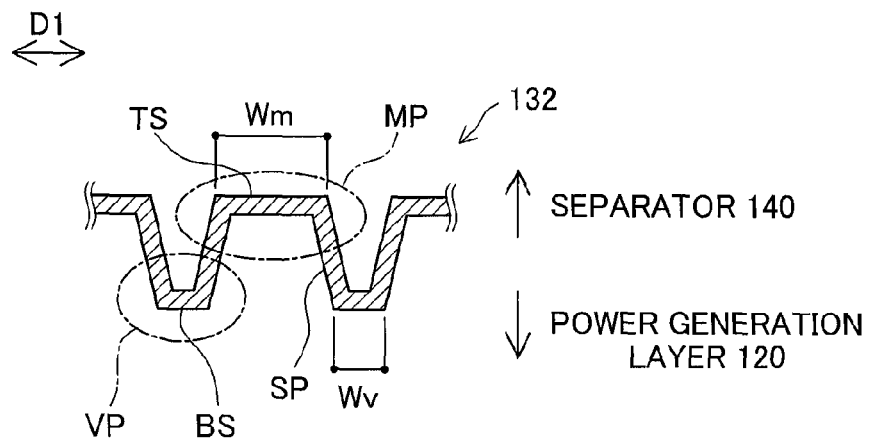
FIG. 5 is a diagram illustrating the structure of the gas flow path layer.
Figure 6:
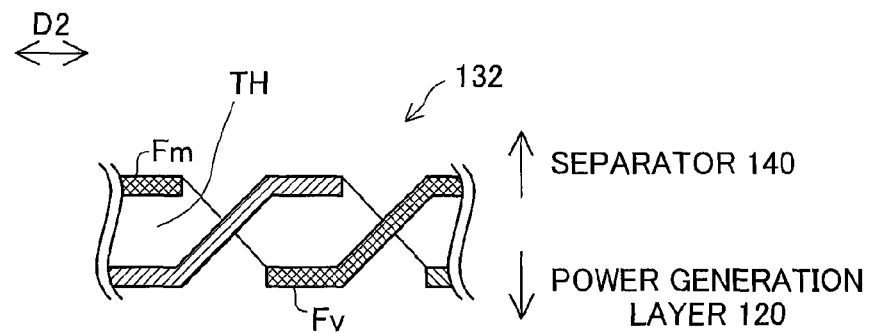
FIG. 6 is a diagram illustrating the structure of the gas flow path layer.

FIGS. 2 to 6 are diagrams illustrating the structure of the gas flow path layer. FIG. 2 illustrates part of the planar configuration of the power generation layer 120-side (more specifically, cathode diffusion layer 122-side) of the cathode-side gas flow path layer 132. FIG. 3 illustrates part of the planar configuration of the opposite side or the separator 140-side of the cathode-side gas flow path layer 132. FIG. 4 is a perspective view of the cathode-side gas flow path layer 132 seen from the separator 140-side. FIG. 5 illustrates the cross sectional structure of the cathode-side gas flow path layer 132, taken on the A-A cross section in FIG. 3. FIG. 6 illustrates the cross sectional structure of the cathode-side gas flow path layer 132, taken on the B-B cross section in FIG. 3.

As shown in FIGS. 2 to 4, the cathode-side gas flow path layer 132 is structured by a plurality of corrugated elements WSE arranged in a second direction D2 substantially perpendicular to the stacking direction of the fuel cell 100. As shown in FIGS. 4 and 5, each of the corrugated elements WSE has a corrugated cross section, where peaks MP that are convex toward the separator 140 and troughs VP that are convex toward the power generation layer 120 are alternately arranged in a first direction D1 that is substantially perpendicular to both the stacking direction and the second direction D2. As shown in FIG. 5, the corrugated element WSE of the cathode-side gas flow path layer 132 has top face sections TS, bottom face sections BS and sloped sections SP connecting the top face section TS with the bottom face section BS. The top face section TS and the top face section TS-side portions of the sloped sections SP form the peak MP, whereas the bottom face section BS and the bottom face section BS-side portions of the sloped sections SP form the trough VP. As shown in FIGS. 2, 3 and 5, the width Wv in the first direction D1 of the bottom face section BS forming the trough VP is less than the width Wm in the first direction D1 of the top face section TS forming the peak VP in each of the corrugated elements WSE. The width of the trough VP in the first direction D1 is accordingly less than the width Wm of the peak MP in the first direction D1.

The concaves and convexes of the corrugated element WSE in the cathode-side gas flow path layer 132 seen from the separator 140-side are reverse to those seen from the power generation layer 120-side. In the specification hereof, the terms "peak MP" and "trough VP" are used only for convenience to differentiate the part of the corrugated element WSE convex toward the separator 140 from the part of the corrugated element WSE convex toward the power generation layer 120, but do not represent the positional relationship between the peak MP and the trough VP. The peak MP corresponds to the first convex of the invention, and the trough VP corresponds to the second convex of the invention.

As illustrated in FIGS. 2 to 4, the plurality of corrugated elements WSE are arranged in the second direction D2, such that part of the top face section TS of the peak MP in one corrugated element WSE and part of the bottom face section BS of the trough VP in an adjacent corrugated element WSE cooperatively form an integral surface FS. The cross section of the cathode-side gas flow path layer 132 in the second direction D2 is thus formed in a step-like shape as shown in FIG. 6. The cathode-side gas flow path layer 132 of this configuration accordingly has a plurality of through holes TH that are arranged in a net-like structure between the adjacent corrugated elements WSE (FIGS. 4 and 6).

As illustrated in FIGS. 2 to 4, it is assumed that one side in the first direction D1 is called "positive side" ("+ side") and the other side in the first direction D1 is called "negative side" ("− side"). The plurality of corrugated elements WSE constituting the cathode-side gas flow path layer 132 include the corrugated element WSE arranged to have the peaks MP and troughs VP shifted in position in the positive side of the first direction D1 relative to the corresponding peaks MP and troughs VP of the adjacent corrugated element WSE in the second direction D2, and the corrugated element WSE arranged to have the peaks MP and troughs VP shifted in position in the negative side of the first direction D1 relative to the corresponding peaks MP and troughs VP of the adjacent corrugated element WSE. In other words, the corresponding peaks MP and troughs VP between the adjacent corrugated elements WSE have the positional shifts not in a single direction but in two directions. For example, in the illustration of FIG. 2, the positions of the peaks MP and the troughs VP are slightly shifted in the positive side of the first direction D1 in a lower area from the lower-most end to the approximate center, whilst the positions of the peaks MP and the troughs VP are slightly shifted in the negative side of the first direction D1 in an upper area from the upper-most end to the approximate center.

According to this embodiment, the absolute value of a positional shift Ls (FIG. 4) between the corresponding peaks MP and troughs VP between one corrugated element WSE and an adjacent corrugated element WSE is set in a range meeting Expression (1) given below. The absolute value of the positional shift Ls means the amount of shift, irrespective of whether the direction of shift is the positive side or the negative side of the first direction D1. In Expression (1), Lp represents the pitch of the peaks MP in the corrugated element WSE (i.e., Lp represents the distance between the adjacent peaks MP and is equal to the pitch of the troughs VP).

$$0 \leq Ls \leq Lp/2 \tag{1}$$

As shown in FIGS. 2 and 6, flat sections Fv parallel to the surface of the power generation layer 120 are formed in the parts of the troughs VP that are in contact with the power generation layer 120 in the respective corrugated elements WSE. Similarly, as shown in FIGS. 3, 4 and 6, flat sections Fm parallel to the surface of the separator 140 are formed in the parts of the peaks MP that are in contact with the separator 140 in the respective corrugated elements WSE.

The contact area (i.e., area of the flat section Fm) of the peak MP that is in contact with the surface of the separator 140 is greater than the contact area (i.e., area of the flat section Fv) of the trough VP that is in contact with the surface of the power generation layer 120.

As shown in FIGS. 2 to 4, a power generation layer-side reaction gas flow path CHm is formed along the positions of the peaks MP between the cathode-side gas flow path layer 132 of the above configuration and the power generation layer 120. A separator-side reaction gas flow path CHv is formed along the positions of the troughs VP between the cathode-side gas flow path layer 132 and the separator 140. The power generation layer-side reaction gas flow path CHm and the separator-side reaction gas flow path CHv are connected with each other via the through holes TH (FIG. 4). The separator-side reaction gas flow path CHv corresponds to the first reaction gas flow path of the invention, and the power generation layer-side reaction gas flow path CHm corresponds to the second reaction gas flow path of the invention.

As described above, in the fuel cell 100 according to this embodiment, the corresponding peaks MP and troughs VP between the adjacent corrugated elements WSE have the positional shifts not in one single direction but in two directions. The power generation layer-side reaction gas flow path CHm and the separator-side reaction gas flow path CHv are accordingly neither in parallel with the second direction D2 nor curved only in one direction, right or left, relative to the second direction D2 but are curved in two directions, right and left, (i.e., serpentine from side to side) relative to the second direction D2 (FIGS. 2 to 4).

Additionally, as described above, the width of the trough VP in the first direction D1 is less than the width Wm of the peak MP in the first direction D1 in each of the corrugated elements WSE. The volume of the separator-side reaction gas flow path CHv formed along the positions of the troughs VP is accordingly less than the volume of the power generation layer-side reaction gas flow path CHm formed along the positions of the peaks MP.

Figure 7:
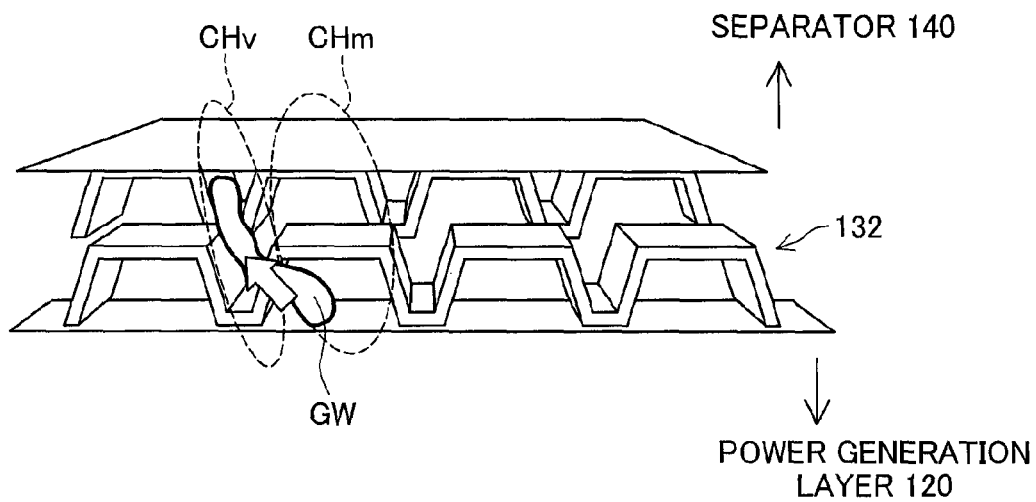
FIG. 7 is a diagram schematically illustrating water produced in a cathode-side gas flow path layer 132.

FIG. 7 is a diagram schematically illustrating water produced in the cathode-side gas flow path layer 132. The produced water GW by power generation (electrochemical reaction) of the fuel cell 100 flows through the power generation layer 120 (or more specifically, its cathode diffusion layer 122) into the power generation layer-side reaction gas flow path CHm of the cathode-side gas flow path layer 132. The separator-side reaction gas flow path CHv has the volume less than that of the power generation layer-side reaction gas flow path CHm. The cathode-side gas flow path layer 132 is treated to be hydrophilic, whilst the cathode diffusion layer 122 is treated to be water repellent. The separator-side reaction gas flow path CHv accordingly has the less total surface energy than the power generation layer-side reaction gas flow path CHm. The produced water GW flowing into the power generation layer-side reaction gas flow path CHm is accordingly pulled via the through hole TH into the separator-side reaction gas flow path CHv (the arrow in FIG. 7). Moving the produced water GW in this manner facilitates the further inflow of the produced water GW from the power generation layer 120 into the power generation layer-side reaction gas flow path CHm. The produced water GW flowing into the separator-side reaction gas flow path CHv flows in the separator-side reaction gas flow path CHv as the continuous flow path to be discharged efficiently. In this manner, the configuration of the fuel cell 100 according to the embodiment facilitates the discharge of the produced water GW from the power generation layer 120 (or more specifically, its cathode diffusion layer 122), thereby preventing an increase in concentration overpotential by the produced water GW and improving the power output.

Additionally, in the fuel cell 100 according to the embodiment, as described above, the produced water GW flowing in the power generation layer-side reaction gas flow path CHm of the cathode-side gas flow path layer 132 is pulled into the separator-side reaction gas flow path CHv and is discharged through the separator-side reaction gas flow path CHv. This configuration facilitates separation between water and the reaction gas (oxidizing gas) in the cathode-side gas flow path layer 132, thereby preventing an increase in pressure loss in the cathode-side gas flow path layer 132 due to the presence of the produced water GW. The configuration of the fuel cell 100 according to the embodiment thus advantageously prevents a variation in distribution of the reaction gas among the respective cells and thereby a variation in cell voltage among the respective cells.

In the fuel cell 100 of the embodiment, the power generation layer-side reaction gas flow path CHm and the separator-side reaction gas flow path CHv are formed serpentine from side to side relative to the second direction D2. This configuration improves the diffusivity of the reaction gas (oxidizing gas) flowing in the cathode-side gas flow path layer 132 and thereby increases the power generation efficiency of the fuel cell 100.

Additionally, in the fuel cell 100 of the embodiment, the flat sections Fv parallel to the surface of the power generation layer 120 are formed in the parts of the troughs VP in the cathode-side gas flow path layer 132, which are in contact with the power generation layer 120, whilst the flat sections Fm parallel to the surface of the separator 140 are formed in the parts of the peaks MP, which are in contact with the separator 140. This configuration advantageously prevents the cathode-side gas flow path layer 132 from biting into the surface of the power generation layer 120 or the surface of the separator 140, thereby preventing reduction of the output performance and the durability of the fuel cell 100. This also prevents the performance degradation of the fuel cell 100 caused by the biting-induced volume reduction of the reaction gas flow paths CHm and CMv in the cathode-side gas flow path layer 132.

In the fuel cell 100 of the embodiment, the contact area (i.e., area of the flat section Fm) of the peak MP that is in contact with the surface of the separator 140 is greater than the contact area (i.e., area of the flat section Fv) of the trough VP that is in contact with the surface of the power generation layer 120. This configuration advantageously prevents an increase in electrical resistance between the layers in the fuel ell 100 and thereby performance degradation of the fuel cell 100.

In the fuel cell 100, the anode-side gas flow path layer 134 has the structure similar to that of the cathode-side gas flow path layer 132. The configuration of the fuel cell 100 according to embodiment thus improves the diffusivity of the reaction gas (fuel gas) flowing in the anode-side gas flow path layer 134 to increase the power generation efficiency of the fuel cell 100, while preventing the reduction of durability of the fuel cell 100.

A-2. Manufacturing Method of Gas Flow Path Layer

Figure 8:
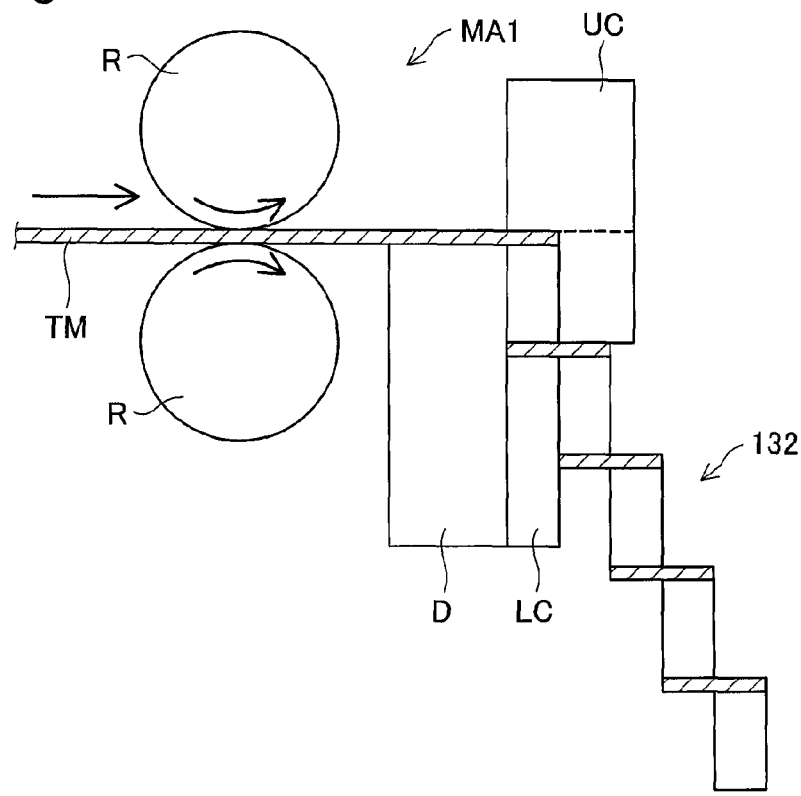
FIG. 8 is a diagram illustrating a manufacturing method of the gas flow path layer.
Figure 9:
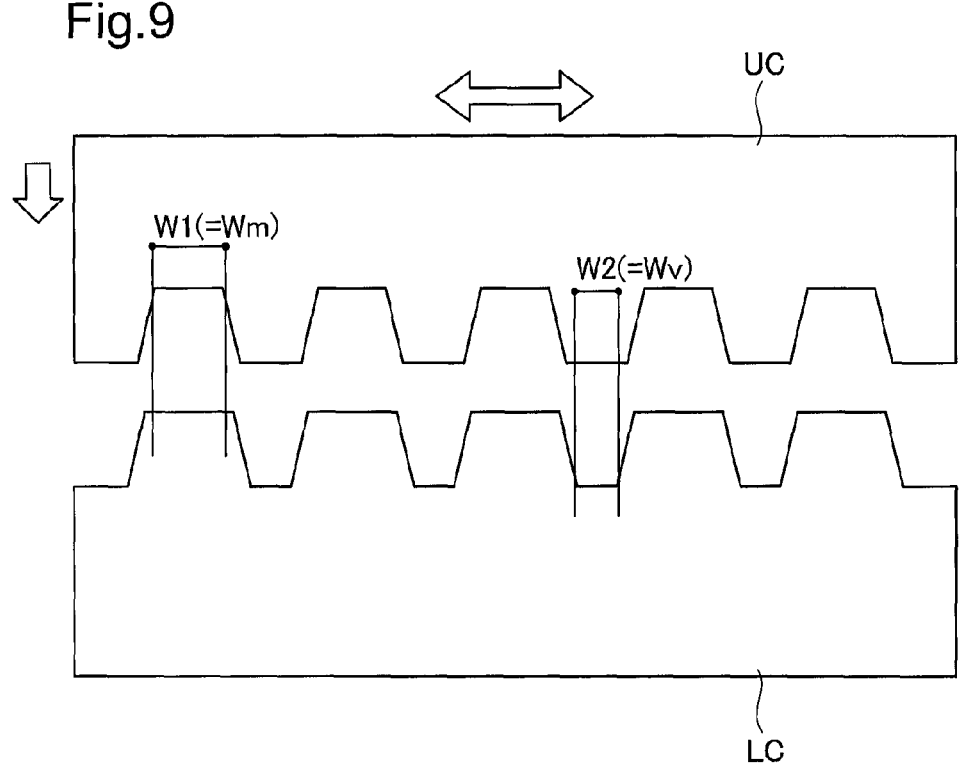
FIG. 9 is a diagram illustrating the manufacturing method of the gas flow path layer.
Figure 10:
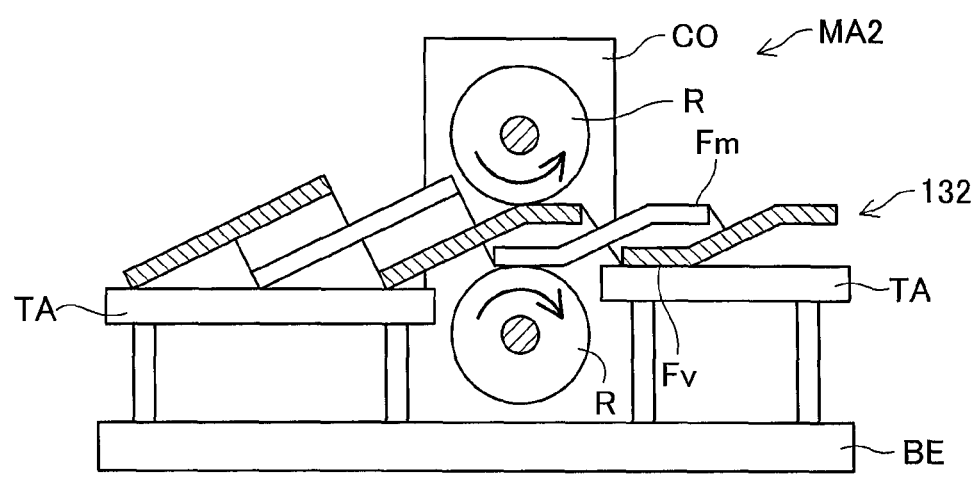
FIG. 10 is a diagram illustrating the manufacturing method of the gas flow path layer.

FIGS. 8 to 10 are diagrams illustrating a manufacturing method of the gas flow path layer. The manufacturing method of the gas flow path layer (cathode-side gas flow path layer 132 and anode-side gas flow path layer 134) includes a main molding step and a flat section formation step. The main molding step is performed using a molding mechanism MA1 shown in FIG. 8. The molding mechanism MA1 includes a pair of upper and lower rollers R, a die D, an upper cutter UC and a lower cutter LC. As illustrated in FIG. 9, the upper cutter UC and the lower cutter LC have teeth having a width W1 corresponding to the width Wm of the peaks MP in the gas flow path layer and teeth having a width W2 corresponding to the width Wv of the troughs VP. The upper cutter UC and the lower cutter LC are arranged to be simultaneously movable in an identical direction, upward, downward, rightward or leftward.

In the main molding step, as shown in FIG. 8, a thin plate TM of metal (e.g., titanium or stainless steel) is fed by the rollers R by the width of one corrugated element WSE in the second direction D2 to the position of the upper cutter UC and the lower cutter LC on the edge of the die D and is then sheared and stretched in the vertical direction by the upper cutter UC and the lower cutter LC. This forms one corrugated element WSE including the peaks MP and the troughs VP that are alternately arranged. The thin plate TM is further fed by the rollers R by the width of another corrugated element WSE, while the upper cutter UC and the lower cutter LC are moved left or right by an amount corresponding to the positional shift Ls (FIG. 4). At this position, the thin plate TM is similarly sheared and stretched in the vertical direction. This forms another corrugated element WSE adjacent to the previously formed corrugated element WSE. Feeding the thin plate TM, moving left or right the upper cutter UC and the lower cutter LC, and shearing and stretching the thin plate TM by the upper cutter UC and the lower cutter LC are repeated in this manner, so as to form the gas flow path layer having the arrangement of the plurality of corrugated elements WSE.

The flat section formation step is then performed using a molding mechanism MA2 shown in FIG. 10. The molding mechanism MA2 includes two tables TA mounted on a bed BE, a column CO placed between the two tables TA, and a pair of upper and lower rollers R provided on the column CO. The distance between the pair of upper and lower rollers R is set to a value corresponding to the thickness of the gas flow path layer after formation of the flat sections Fm and Fv. During the flat section formation step, the gas flow path layer formed by the main molding step is fed to between the pair of upper and lower rollers R, and the protruded edges of the gas flow path layer are pressed by the rollers R to form the flat sections Fm and Fv in the gas flow path layer. This series of manufacturing process completes the gas flow path layer of the configuration described above.

B. Modifications

The invention is not limited to the above embodiment or its applications, but a multiplicity of variations and modifications may be made to the embodiment without departing from the scope of the invention. Some examples of possible modification are described below.

B1. Modification 1

According to the above embodiment, the fuel cell 100 is manufactured to have the cathode-side gas flow path layer 132 and the anode-side gas flow path layer 134. According to another embodiment, the fuel cell 100 may have only the cathode-side gas flow path layer 132 but not include the anode-side gas flow path layer 134. On the contrary, the fuel cell 100 may have only the anode-side gas flow path layer 134 but not include the cathode-side gas flow path layer 132.

The structure of the gas flow path layers 132 and 134 described in the above embodiment is only illustrative and may be changed and altered in various ways. For example, the peak MP is only required to have the cross section convex toward the separator 140 and may not be necessarily defined by the top face section TS and the sloped sections SP. Similarly the trough VP is only required to have the cross section convex toward the power generation layer 120 and may not be necessarily defined by the bottom face section BS and the sloped sections SP. It is not essential that all the peaks MP are formed in an identical shape or all the troughs VP are formed in an identical shape.

According to the above embodiment, the absolute value of the positional shift Ls between the corresponding peaks MP or the corresponding troughs VP of one corrugated element WSE and an adjacent corrugated element WSE is set in the range meeting Expression (1) given above. It is, however, not essential that the absolute value of the positional shift Ls is set in the range meeting Expression (1) given above.

According to the above embodiment, the troughs VP and the peaks MP of each corrugated element WSE are formed to have the flat sections Fv and Fm. According to another embodiment, the troughs VP and the peaks MP may be formed to have no flat sections Fv and Fm. In this application, the manufacturing process of the gas flow path layers 132 and 134 does not include the flat section formation step. According to yet another embodiment, the troughs VP may be formed to have the flat sections Fv, while the peaks MP may be formed to have no flat sections Fm.

According to the above embodiment, the gas flow path layers 132 and 134 are made of expanded metal. According to another embodiment, the gas flow path layers 132 and 134 may be provided by forming another conductive material (e.g., carbon) in the similar shape to that described above.

B2. Modification 2

According to the above embodiment, the fuel cell 100 is manufactured to have the anode diffusion layer 124 and the cathode diffusion layer 122. According to another embodiment, the fuel cell 100 may be manufactured to have no anode diffusion layer 124 or cathode diffusion layer 122. In this application, the power generation layer 120 includes only the electrolyte membrane 112, the anode 116 and the cathode 114. According to the above embodiment, the diffusion layers 122 and 124 are treated to be water repellent. It is, however, not essential that the diffusion layers 122 and 124 are treated to be water repellent. According to the above embodiment, the gas flow path layers 132 and 134 are treated to be hydrophilic. It is, however, not essential that the diffusion layers 122 and 124 are treated to be hydrophilic.

B3. Modification 3

The materials for the respective layers of the fuel cell 100 are specified in the above embodiment. The available materials are, however, not limited to those described in the embodiment, but a variety of other adequate materials may be used for the same purpose. According to the above embodiment, the fuel cell 100 is the polymer electrolyte fuel cell. The invention is, however, also applicable to various other fuel cells (for example, direct methanol fuel cell and phosphoric acid fuel cell).

What is claimed is:

1. A fuel cell, comprising:
   a power generation layer including an electrolyte membrane, an anode formed on one side of the electrolyte membrane and a cathode formed on the other side of the electrolyte membrane;
   a pair of separators arranged across the power generation layer; and
   a pair of gas flow path layers provided between the power generation layer and the pair of separators, wherein one of the pair of gas flow layers is provided on one side of the power generation layer and another one of the pair of gas flow layers is provided on another side of the power generation layer, wherein each of the pair of gas flow path layers is structured by a plurality of corrugated elements, wherein each corrugated element has a corrugated cross section where first convexes are convexed outward toward the separator and second convexes are convexed inward toward the power generation layer, the first convexes and the second convexes are alternately arranged in a first direction in the each corrugated element, and the plurality of corrugated elements are arranged in a second direction that is perpendicular to the first direction of the fuel cell and the first direction, such that at least part of a top surface of the first convex in one corrugated element and at least part of a bottom surface of the second convex in an adjacent corrugated element cooperatively form an integral surface, and a plurality of through holes are formed between the respective adjacent corrugated elements, wherein the plurality of corrugated elements constituting each of the pair of gas flow path layers include a corrugated element having positions of the first convexes and the second convexes shifted in a positive side of the first direction from those of an adjacent corrugated element in the second direction, and a corrugated element having positions of the first convexes and the second convexes shifted in a negative side of the first direction from those of an adjacent corrugated element in the second direction, and wherein, in both of the pair of gas flow path layers, a first reaction gas flow path is formed in the second convexes, which are convexed inward toward the power generation layer, on a separator-side of the gas flow path layer, and a second reaction gas flow path is formed in the first convexes, which are convexed outward toward the separator, on a power generation layer-side of the gas flow path layer, the second reaction gas flow path is connected with the first reaction gas flow path via a through hole, and a volume of the first reaction gas flow path on the separator-side is less than a volume of the second reaction gas flow path on the power generation layer-side.

2. The fuel cell according to claim 1, wherein
in each of the plurality of corrugated elements, a width of the second convex in the first direction is less than a width of the first convex in the first direction.

3. The fuel cell according to claim 1, wherein
in each of the plurality of corrugated elements, a flat section parallel to surface of the power generation layer is formed in a part of the second convex that is in contact with the surface of the power generation layer.

4. The fuel cell according to claim 3, wherein
in each of the plurality of corrugated elements, contact area of the first convex that is in contact with surface of the separator is greater than contact area of the second convex that is in contact with the surface of the power generation layer.

5. The fuel cell according to claim 1, wherein
the power generation layer further includes:
an anode diffusion layer provided on the other side of the anode opposite to a side in contact with the electrolyte membrane; and
a cathode diffusion layer provided on the other side of the cathode opposite to a side in contact with the electrolyte membrane, wherein
the pair of gas flow path layers are treated to be hydrophilic, and
the anode diffusion layer or the cathode diffusion layer in the power generation layer is treated to be water repellent.

* * * * *